April 25, 1961

J. E. FLEISSNER 2,981,007

WILLOW DRIER

Filed Oct. 21, 1957

Inventor:
JOHANN EDMUND FLEISSNER
Bailey, Stephens & Huettig
Attorneys

United States Patent Office 2,981,007
Patented Apr. 25, 1961

2,981,007

WILLOW DRIER

Johann Edmund Fleissner, Egelsbach, near Offenbach (Main), Germany, assignor to Fleissner & Sohn Maschinenfabrik, Egelsbach, Germany, a firm of Germany Filed Oct. 21, 1957, Ser. No. 691,504

Claims priority, application Germany Nov. 23, 1956

1 Claim. (Cl. 34—115)

The present invention relates to a willow or sieve drum drier for drying materials which are impermeable or substantially impermeable to air, such as cellulose.

It is an object of the present invention to provide a willow or sieve drum drier for drying an impermeable or substantially impermeable material from both sides by sucking the drying air out of the interior of the perforated drums and by then applying the same air to the material on the outside of the drums, and by covering up those parts of the drums which are not covered by the material to be dried.

Prior to this invention, materials which are impermeable or substantially impermeable to air and form continuous webs were usually dried on calenders. These calenders consisted of large copper cylinders which were heated from the inside with steam or hot water and over the outer surface of which the material to be dried was passed. The drying operation has also been carried out on conveyer belts which were permeable to air, and in this case the drying air was applied to the material to be dried either in the longitudinal or transverse direction thereof or was blown upon both sides of the material by means of nozzles.

According to the present invention, however, such materials are dried on driers with rotary perforated drums of the above-mentioned design. Such method of drying has the advantage of being more intensive than the previous drying methods due to the fact that the drying air is blown alternately upon one side or the other of the material on the several successive perforated drums of the drier. This is carried out according to the invention by blowing the drying air, for example, through nozzles upon the outside of the material lying on the perforated drums and then conducting the drying air around the edge of the material to the inside of the drums. For this purpose, the perforated drums according to the invention are preferably made of greater width than the width of the material to be dried, and the edge portions of the drums projecting beyond the material are provided with apertures through which the drying air, after having been blown upon the outer surface of the material, for example, through nozzles, is passed toward the inside of the drums which is maintained under a reduced pressure. In order to protect the edges of the material from being damaged by the air passing under suction around them, the invention further provides the drier drums with an unperforated part between the perforated part which is covered by the material and the likewise perforated part projecting beyond each edge of the material so that the edges of the material will then lie upon these unperforated parts of the drum wall.

Further objects, features, and advantages of the present invention will be apparent from the following detailed description thereof, particularly when read with reference to the accompanying drawings, in which—

Fig. 2 shows a cross section through one of the drums taken at a right angle to Fig. 1; while

Figure 1:
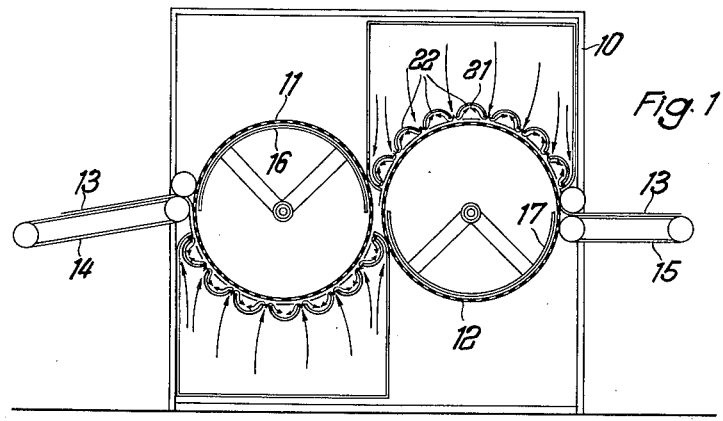
Fig. 1 shows a longitudinal cross section through a drum drier according to the invention.
Figure 2:
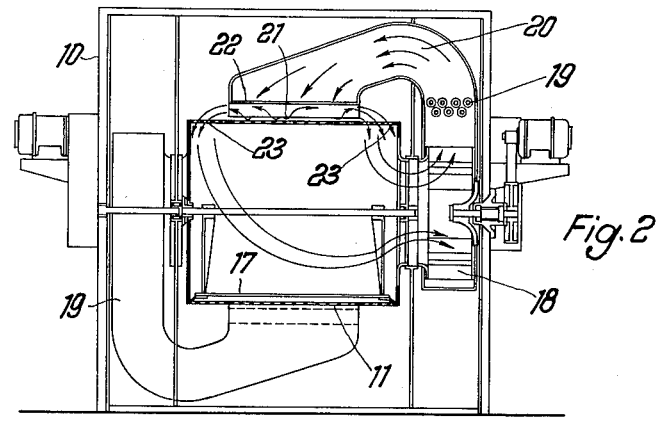

Referring to the drawings, the housing 10 of the drier contains, for example, two perforated drums 11 and 12 which are rotatably mounted therein behind each other. The material 13 to be dried is fed to drums 11 and 12, for example, by means of a conveyer belt 14. It first passes along the lower side of drum 11 and then along the upper side of drum 12, and is finally removed from the drier by means of a conveyer belt 15. Those parts of the drums which are not covered by the material 13 are covered up by cover plates 16 and 17 at the inside of the drums. Each drum 11 and 12 is associated with a fan 18. Thus, for example, fan 18 sucks the air out of drum 11 and conveys the same over heating coils 19 and through a conduit 20 and a nozzle unit 21, the individual nozzle openings of which are distributed over the upper surface of drum 12 but spaced at a small distance therefrom. The air is thus blown through the nozzles upon the upper surface of the material 13 passing along the drums. Nozzle units 21 are open ended to provide channels 22 through which the air can escape toward one or both sides of the drums. The air emerging laterally from channel 22 then passes through apertures 23 which are provided in the peripheral wall of each drum laterally of the edge of the material 13 to be dried. For this purpose, the drums are made of greater width than the width of the material 13 thereon. The drying air then passes through apertures 23 to the inside of the drums where a suction is maintained by fan 18. Through such suction the material 13 is held tightly upon each drum, while the drying air is continuously supplied from the outside toward the inside of the drum.

Figure 3:
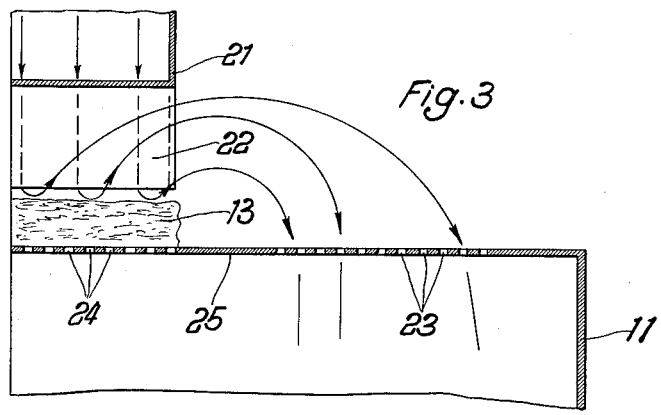
Fig. 3 shows a partial cross section through the peripheral wall of a drum and illustrates the passage of drying air upon the material and into the drum.

Fig. 3 illustrates more specifically the construction of one edge of drum 11. The material 13 is directly acted upon by the air passing through nozzle 21. Underneath nozzles 21 are the first set of apertures 24 in the drum which are coextensive with the longitudinal length of the channels 22 and through which the suction is exerted upon the material 13. Near the outer edge of drum 11, the peripheral wall thereof is provided with a second set of apertures 23 through which the air emerging from channels 22 passes to the inside of drum 11. Between apertures 23 and apertures 24 there is an imperforate wall portion 25 which supports the outer edge of the material 13. The drying air therefore flows away from the edge of the material and does not flow around it directly and toward the inside of the drum but only at a distance therefrom which corresponds to the width of the imperforate portion 25. This prevents the edge of the material from being damaged inasmuch as, if the drying air could flow directly around the edge of the material, some parts of the material might be torn off and taken along by the air current.

A willow or sieve drum drier according to the present invention therefore will dry any kind of materials very quickly and effectively, including materials which are impermeable to air.

Although my invention has been illustrated and described with reference to the preferred embodiments thereof, I wish to have it understood that it is in no way limited to the details of such embodiments, but is capable of numerous modifications within the scope of the appended claim.

Having thus fully disclosed my invention, what I claim is:

A sieve drum drier for drying material substantially impervious to air comprising a rotatable drum having a peripheral wall adapted to carry the material to be dried, a plurality of open ended air channels covering substantially one-half of the outer periphery of the drum and having a longitudinal length less than the axial length of the drum and substantially equal to the width of the material to be dried on said drum, said wall having in sequence a first set of apertures coextensive with the length of said channels, imperforate wall portions on each side of said first set of apertures and a second set of apertures between said imperforate portions, respectively, and each end of said drum, a cover plate inside said drum and extending over the half of the drum not covered by said air channels, a suction fan at one end of said drum for drawing air through said apertures into the interior of said drum, and conduit means for recycling the air from said fan into said air channels and against said material.

References Cited in the file of this patent

UNITED STATES PATENTS

| | | |
|---|---|---|
| 1,377,793 | Schwartz | May 10, 1921 |
| 2,301,249 | Butterworth et al. | Nov. 10, 1942 |
| 2,349,558 | Offen | May 23, 1944 |
| 2,570,318 | Butterworth et al. | Oct. 9, 1951 |
| 2,755,513 | Fleissner | July 24, 1956 |